Feb. 6, 1934. R. B. PENFIELD 1,945,912
TURNING IMPLEMENT
Filed March 2, 1932
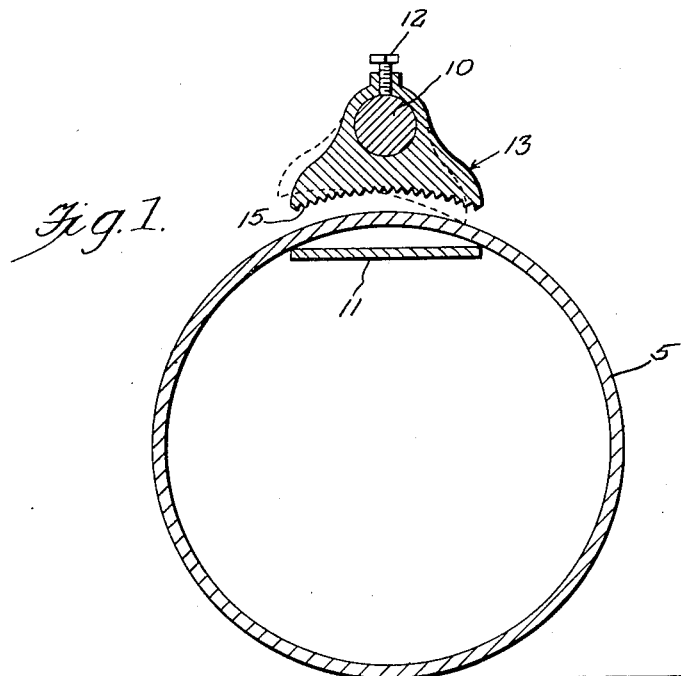
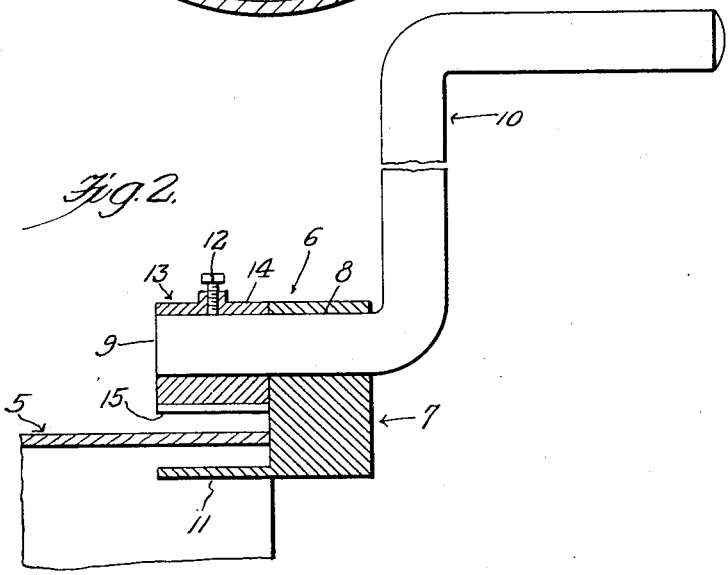
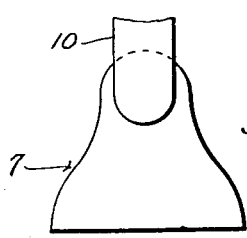
Inventor
Ralph B. Penfield,
By Clarence A. O'Brien
Attorney Patented Feb. 6, 1934

1,945,912

UNITED STATES PATENT OFFICE 1,945,912

TURNING IMPLEMENT

Ralph B. Penfield, Sedan, Kans.

Application March 2, 1932. Serial No. 596,389

2 Claims. (Cl. 81—71)

My invention relates to turning implement, and has for its object the provision of a turning implement suitable for rotating pipe in forming pipe joints and the like.

Another object of the invention is to provide a device of this kind which does not require adjustment in order to clear pipe flanges and the like, and which greatly increases the ease with which pipe and the like may be rotated for forming joints and the like.

Other objects and advantages of my invention will be apparent from the following description and the drawing, wherein for purposes of illustration I have shown a preferred embodiment of the invention.

In the drawing:—

Figure 1 is a vertical transverse sectional view through a pipe and through the embodiment showing the relationship thereof.

Figure 2 is a longitudinal vertical section through Figure 1.

Figure 3 is a view of the implement taken from the right in Figure 2.

Referring in detail to the drawing, wherein like numerals refer to like parts throughout the same, the numeral 5 generally refers to a piece of pipe or the like with which the device of the invention generally designated 6 is to be associated so as to rotate the pipe with a greater degree of leverage at a given expenditure of effort, whereby to bring about the formation of tighter joints and generally facilitate work requiring the rotating of pipes and the like.

The device of the invention comprises the fan-shaped block 7 which has through the upper part thereof a generally horizontal opening 8 through which snugly but rotatably fits the crank pin 9 on a crank generally designated 10. Laterally extended from the wide lower end of the block 7 is a generally horizontal flange 11 arranged to engage its side edges with the interior surface of the pipe 5 as indicated in Figure 1.

Secured by means of a set screw 12 on the portion of the crank pin 9 which extends beyond the block 7 and over the extension 11, is a jaw member 13 of general fan-shape. The jaw member 13 has in its upper part a horizontal opening 14 for snugly receiving the protruding end of the crank pin 9 so as to carry the jaw member 13 in spaced relation with and over the horizontal extension 11, so as to enable passing the device without adjustment upon a section of pipe, where the end section is provided with a flange or enlargement. This feature of the device provides for properly clearing the flange or enlargement without undue manipulation of the device or any adjustments thereof.

On the under surface of the jaw member 13 which is curved there is provided a series of serrations or teeth 15 for engaging the exterior of the pipe when the device is rocked by bearing upon the crank 10. This permits non-slipping engagement of the device with the pipe. As the device is tilted under the action of the crank 10, one edge of the horizontal extension 11 will engage the interior of the pipe, and one end portion of the jaw member 13 will engage the exterior of the pipe, whereby to produce a non-slipping engagement of the device with the pipe as effort is expended upon the crank 10 in rotating the pipe for the purposes specified.

Though I have shown and described herein a preferred embodiment of the invention, it is to be understood that various changes in size, shape and materials and arrangement of parts may be made without departure from the spirit of the invention and the scope of the subjoined claims.

What is claimed is:—

1. In a pipe rotating device, a rod, an outside jaw fastened on said rod, a body having a bore rotatably receiving a portion of said rod adjacent said outside jaw, said body having a portion extending therefrom and arranged along and laterally spaced from said outside jaw and constituting an inside jaw, said outside jaw having a curved face having opposite end portions only one of which is adapted to engage the outside of the pipe at a time, said inside jaw having opposite edge portions both of which are arranged to engage the inside of the pipe when said rod is rotated for rotating the pipe, and a handle on said rod having a lateral portion for engaging that end of said body which is opposite that end engaged by said outside jaw, said lateral portion acting to confine said body on said rod and facilitating rotation of said rod.

2. In a pipe rotating device, a rod, an outside jaw fastened on said rod, a body having a bore rotatably receiving a portion of said rod adjacent said outside jaw, said body having a portion extending therefrom and arranged along and laterally spaced from said outside jaw and constituting an inside jaw, said outside jaw having a curved face having opposite end portions only one of which is adapted to engage the outside of the pipe at a time, said inside jaw having opposite edge portions both of which are arranged to engage the inside of the pipe, and a handle on said rod having a lateral portion for engaging that end of said body which is opposite that end engaged by said outside jaw, said lateral portion acting to confine said body on said rod and facilitating rotation of said rod, said outside jaw being removably fastened to said rod to enable its removal from said rod to permit ready removal of said body from said rod.

RALPH B. PENFIELD.